United States Patent [19]

Smith

[11] 4,141,463
[45] Feb. 27, 1979

[54] HERMETICALLY SEALED CONTAINER

[75] Inventor: Ernest L. Smith, Kansas City, Mo.

[73] Assignee: Phillips Petroleum Company, Bartlesville, Okla.

[21] Appl. No.: 858,597

[22] Filed: Dec. 8, 1977

[51] Int. Cl.² .............................................. B65D 41/00
[52] U.S. Cl. ..................................... 220/359; 220/306;
229/43; 53/477; 215/DIG. 1
[58] Field of Search ............... 220/359, 257, 258, 256,
220/306; 150/5; 229/43, 5.6, 48 T; 215/DIG. 1;
53/39

[56] References Cited

U.S. PATENT DOCUMENTS

| 3,532,244 | 10/1969 | Yates, Jr. .................. 215/DIG. 1 |
| 3,973,719 | 8/1976 | Johnson et al. .............. 220/359 X |
| 4,044,941 | 8/1977 | Knudsen ..................... 220/359 X |

Primary Examiner—George T. Hall

[57] ABSTRACT

A hermetically sealed recloseable container is disclosed wherein continuous sealing means on the underside of the container closure are bonded to a coating on the rim surrounding the opening in the upper end of the container. Also disclosed is a closure and method of forming such a container using such a closure.

13 Claims, 3 Drawing Figures

HERMETICALLY SEALED CONTAINER

This invention relates to hermetically sealed containers. In another aspect this invention relates to closure for use in forming hermetically sealed containers. In yet another aspect this invention relates to the method of obtaining hermetically sealed recloseable containers.

Hermetically sealed containers help both to maintain the freshness of container contents and to provide customers with means of detecting whether or not anyone has tampered with the contents of the container. The most common means of providing hermetically sealed containers involves the use of a membrane closure such as thin disks of thermoplastic film bonded to the upper perimeter of an open-ended container. Once such membrane closures have been opened some other type of closure must be provided. Thus many hermetically sealed containers are provided with overcaps which can be used to reclose the container after the membrane closure has been removed.

An object of the present invention is to provide a closure which can be used to hermetically seal a container and which can be used to reclose the container after the hermetic seal has been broken.

Another object of this invention is to provide a container hermetically sealed with such a closure.

The container closure of this invention comprises a top panel, one or more continuous sealing means depending downwardly from the lower surface of said top panel, each sealing means being adapted to form a frangible bond to a coating on the rim of a corresponding container to form a seal completely around the opening in the upper end of such a container, and a skirt depending downwardly from said top panel so as to surround the outer surface of the upper end of such a corresponding container.

The container closure of the instant invention can be constructed of any suitable material. The only limitation is that the sealing means be constructed of material which will form a frangible bond with the coating on the rim of a corresponding container. The term "frangible" as used herein in reference to the bond between the sealing means and the rim coating is intended to indicate that when the bond is formed and the closure is removed, the bond between the rim and the sealing means will be severed. Included within the scope of the term is the separation of the sealing means from the coating as well as the separation of portion of the coating from the rim. Preferably the total closure is constructed of thermoplastic.

The container of the instant invention can be of any suitable construction. The coating on the rim of the container around the opening can be of any suitable material which will form a frangible bond with the sealing means of the inventive closure. For example, the coating could be of any suitable adhesive. In a preferred embodiment of the present invention the coating is of thermoplastic or heat-activated adhesive which is heat-bondable to the sealing means of the closure.

The sealing means can be constructed of any material which will form an adequate bond with the coating on the rim of the container. Preferably, the sealing means is comprised of thermoplastic which upon heating will bond to the coating on the rim of the container. In an especially preferred embodiment each sealing means is generally V-shaped in cross section forming a downwardly pointing thermoplastic projection which after bonding to the rim coating will provide a bond surrounding the opening of a corresponding container. Such V-shaped sealing means, when employed, should depend downwardly such a distance that when the closure is applied with pressure after each such sealing means has been heated to a fusible and deformable state, the lower portion of the downwardly depending means will flatten and bond to the rim coating. An advantage of using the generally V-shaped sealing means is that the lower portion is more readily rendered deformable and bondable to the rim coating than a sealing means having blunt lower end. The total cross-sectional width of the area of bonding between the sealing means and the rim coating that is necessary to provide a securely sealed yet readily opened container can be determined by routine experiment. An especially preferred embodiment employs a plurality of concentric separate sealing means. Such an embodiment provides more insurance against the accidental breakage of the seal than a single sealing means while at the same time allowing the seal to be easily boken intentionally.

For a container having an outwardly directed rim it s preferable if the closure portion includes on a lower portion of the skirt inwardly directed rib means adapted to fit under the innermost portion of the outwardly directed contaner rim after the closure has been applied and sealed to the container. Such rib means are useful in keeping the closure in place once it is replaced after the original seal has been broken.

The sealing of a closure as described above to the coating on the rim of a corresponding container can be accomplished in any suitable manner. In a preferred embodiment employing a closure in which the sealing means are thermoplastic, one heats the thermoplastic sealing means to render the sealing means bondable to the rim coating and applies the closure with pressure, both under conditions such that the closure bonds to the container only where the sealing means contacts the rim coating. The heating of the sealing rings in such a technique can be accomplished in any suitable manner. The only limitation is that the sealing rings must be heated in such a fashion that the closure will bond only where said sealing means contact said container.

One preferred method of heating th sealing means involves applying the closure to the container with pressure and then applying ultrasonic vibrations to the sealing means. Another method involves heating the sealing means with narrowly directed jets of hot gas prior to the application of the closure to the container. Yet another method involves heating the sealing means with infrared heat. Still another method involves the induction heating of suitable electrically conductive means suitably positioned in the container closure, the rim of the container, or both. For example, one could embed a suitable electrically conductive ring in a portion of the closure superimposed immediately above the sealing means.

Sealing means of polyethylene can be rendered suitably bondable to the rim coating by heating the sealing means to a temperature in the range of 300° F.–350° F. (149° C.–176° C.).

A better understanding of the present invention will follow from a description of a preferred embodiment of the present invention as illustrated in the accompanying drawings in which.

Figure 1:
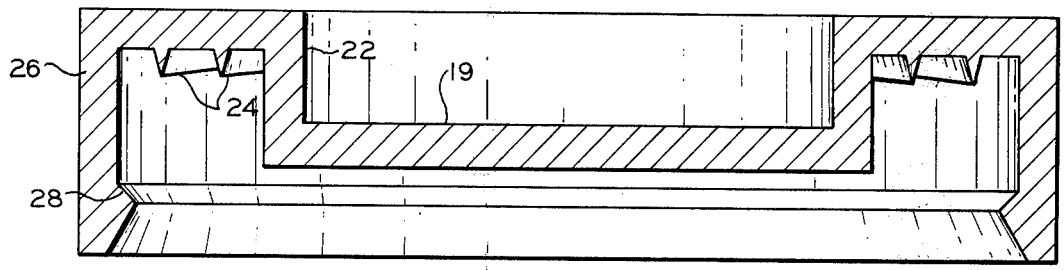
FIG. 1 is a cross-sectional view of a preferred closure embodying the present invention.

FIG. is a partial cross-sectional view of the closure of FIG. 1 after the hermetic seal has been obtained.

The closure 1 illustrated in FIG. 1 comprises a circular top panel 20 having downwardly directed from its inner periphery a cylindrical portion 22, surrounding a central discoidal portion 19. Depending downwardly from the lower surface 18 of the top panel 20 are two generally V-shaped sealing means 24. Depending downwardly from the outer periphery of said top panel 20 is an annular skirt 26. The lower portion of said annular skirt 26 includes an inwardly disposed rib 28 which from its innermost point relative to the center of the closure inclines outwardly and downwardly to the end of the annular skirt 26.

Figure 2:
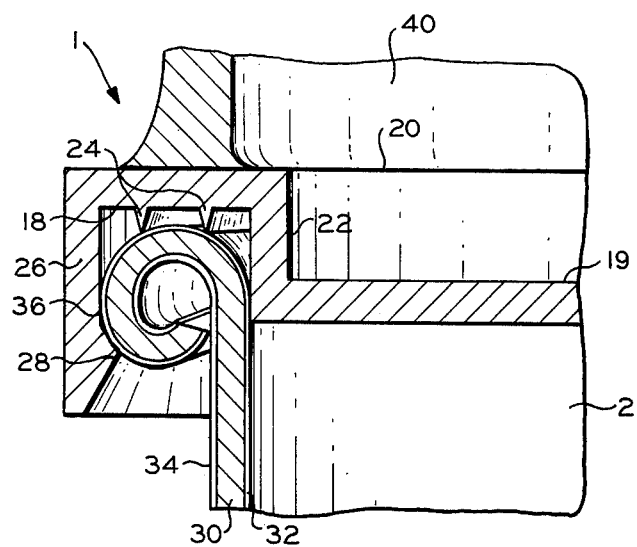
FIG. 2 is a partial cross-sectional view of the closure of FIG. 1 applied to a container prior to the forming of a hermetic seal.

FIG. 2 illustrates the closure of FIG. 1 being applied to a container 1 for which it is particularly suitable, viz., a cylindrical container having a paperboard sidewall. FIG. 2 illustrates a cross section of the upper end of such a container. In the illustration the container sidewall comprises paperboard 30 coated on both surfaces with a thermoplastic coating 32 and 34 such as polyethylene. The upper end of the container sidewall is rolled outwardly and inwardly to form an outwardly disposed rim 36 with a generally circular cross-sectional configuration.

It will be noted in FIG. 2 that the sealing means 24 of the closure 1 are positioned in the closure 1 such that they contact the upper surface of the rim 36 when the closure is applied to the container 2.

FIG. 2 also illustrated one method in which the sealing means can be rendered sufficiently deforamble and heat-sealable to provide the hermetic seal. FIG. 2 illustrates that after the closure 1 is applied to the container 2 a ring-shaped ultrasonic horn 40 applies ultrasonic vibration to the closure to cause the sealing means to be rendered bondable to the thermoplastic coating 32 of the container 2.

As the closure 1 is applied to the container the annular skirt 26 bends outwardly as the rib 28 passes over the outermost portion of the container from 36. Once the sealing means 24 are in a deforamble state and the closure 1 is forced downward onto the container 2 with pressure, the sealing means 24 will be deformed so that the closure 1 fits onto the container 2 in such a manner that the rib 28 rests beneath the outermost portion of the container rim 36.

Figure 3:
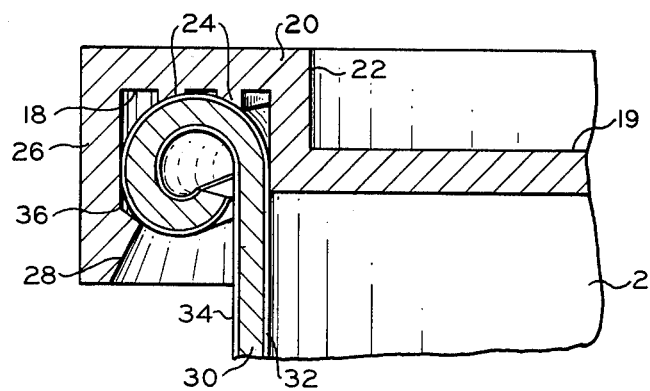

FIG. 3 illustrates that after the closure 1 has been hermetically sealed to the container 2, a bond is provided between the point of contact of the sealing means 24 and the container rim 36. Removal of the closure will result in the elimination of the bond between the sealing means and the container rim.

The aforementioned downwardly directed portion 22 of closure 1 is formed such that after said container is sealed the inside surface of portion 22 contacts the inside surface of the upper end portion of the container. Preferably the annular skirt 26 and rib 28 are formed such that after the container is sealed both the annualar skirt 26 and the rib 28 thereof are in contact with the container rim 36 around the periphery of said container. Such a closure has been illustrated in FIGS. 1-3. As shown by FIG. 3, the top panel 20, the downwardly depending portion 22, and the annular skirt 26 provide a downwardly opening trough in which the outwardly disposed rim 36 is contained once the container 2 has been sealed with closure 1.

Generally in such container that thickness of the paperboard in the sidewall is in the range of about 14 to about 28 mils and the thermoplastic coatings 32 and 34 are of a thickness in the range of about 0.0004 to about 0.0001 inch.

While the appended FIGURES and the above description thereof illustrate a preferred embodiment of the present invention, it is to be recognized that the invention is not limited solely to the illustrated embodiment. For example, while the closure 1 illustrated has a circular top panel 20 with a depending cylindrical portion 22 and a discoidal portion 19, top panel 20 can extend across the top in one plane and still provide a hermetically sealed container. Rim 36 can be of other configurations such as oval, square or rectangular and the like.

It is to be understood that other variations which will be obvious on view of this disclosure are within the scope of the claimed invention.

What is claimed is:

1. A hermetically sealed, recloseable container comprising (1) a container portion the upper end of which comprises an opening and a rim surrounding said opening wherein said rim has on its upper surface completely around said opening a bondable coating, (2) a closure portion comprising (a) a top panel, (b) at least one downwardly pointing thermoplastic ring projection adapted to rest upon said rim of said container portion completely around said opening, each said projection having been heated to a deformable state and the closure applied with pressure such that each said projection will form a continuous frangible bond with said bondable coating completely around the opening such that the only points of bonding between said closure and said container are in the area of contact between each said projection and said rim, and (c) a skirt depending downwardly from said top panel and surrounding the outer surface of an upper end portion of said container portion.

2. A hermetically sealed, recloseable container according to claim 1 wherein each said projection prior to the application of said close is generally V-shaped.

3. A hermetically sealed, recloseable container according to claim 2 wherein said container portion in cylindrical, said rim projects outwardly of the sidewall of said container, and the lower portion of the annular skirt contains an inwardly projecting rib means which fits under said outwardly projecting rim.

4. A hermetically sealed container according to claim 2 wherein said container portion comprises a sidewall of paperboard, said rim comprises an outwardly rolled portion of the upper end of said sidewall, and said coating comprises a coating of thermoplastic on the upper surface of said rim.

5. A hermetically sealed container according to claim 2 wherein said inwardly projecting rib means of said annular skirt from its innermost point relative to the center of said closure portion inclines outwardly and downwardly to the lower end of said annular skirt.

6. A hermetically sealed container according to claim 5 wherein the inner side of the lower end of said annular skirt of said closure portion is at least as great in circumference as the circumfernce of the outermost portion of the outwardly disposed rim of said container portion.

7. A hermetically sealed container according to claim 6 wherein said closure has two of said projections.

8. A hermetically sealed container according to claim 7 wherein the coating of thermoplastic on the rim of said container portion has a thickness in the range of about 0.0004 to about 0.0001 inch, and wherein the thickness of the paperboard in the sidewall of said container portion is in the range of about 14 to about 28 mils.

9. A hermetically sealed container according to claim 8 wherein said closure portion is constructed of thermoplastic.

10. A hermetically sealed container according to claim 9 wherein said top panel of said closure portion contains a downwardly directed portion surrounding a central discoidal panel, and said downwardly directed portion adjoins the inside of the upper end of the container portion to provide in combination with said downwardly depending annular skirt a downwardly opening trough containing said outwardly disposed rim of said container portion.

11. A hermetically sealed container according to claim 10 wherein the inner surface of said downwardly depending skirt of said closure portion above said rib adjoins the outer surface of said rim of said container.

12. A hermetically sealed container according to claim 2 wherein said top panel of said closure portion contains a downwardly directed portion adjoins the inside of the upper end of the container portion to provide in combination with said downwardly depending annular skirt a downwardly opening trough containing said outwardly disposed rim of said container portion.

13. A hermetically sealed container according to claim 2 wherein the inner surface of said downwardly depending skirt of said closure portion above said rib adjoins the outer surface of said rim of said container.

* * * * *

UNITED STATES PATENT AND TRADEMARK OFFICE
CERTIFICATE OF CORRECTION

PATENT NO. : 4,141,463
DATED : February 27, 1979
INVENTOR(S) : Ernest L. Smith

It is certified that error appears in the above-identified patent and that said Letters Patent are hereby corrected as shown below:

Column 4, line 46, after "portion" and before "cylindrical" delete "in" and insert -- is --.

Column 4, line 65, delete "circumfernce" and insert -- circumference --.

Column 6, line 9, after "portion" and before "adjoins" insert

-- contains a downwardly directed portion surrounding a central discoidal panel, and said downwardly directed portion --.

Signed and Sealed this

Twenty-ninth Day of May 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,141,463
DATED : February 27, 1979
INVENTOR(S) : Ernest L. Smith

It is certified that error appears in the above-identified patent and that said Letters Patent are hereby corrected as shown below:

Column 6, line 8, change "2" to --- 3 ---.

Column 6, line 15, change "2" to --- 3 ---.

Column 4, line 44, change "close" to --- closure ---.

Column 6, line 16, after "rib" insert --- means ---.

Signed and Sealed this

Third Day of March 1981

[SEAL]

*Attest:*

*Attesting Officer*

RENE D. TEGTMEYER

*Acting Commissioner of Patents and Trademarks*